(12) United States Patent
Chen

(10) Patent No.: US 6,402,475 B1
(45) Date of Patent: Jun. 11, 2002

(54) BLADE OF A CEILING FAN

(76) Inventor: Pi-Chin Chen, No. 19, Alley 24, Lane 12, Nanking Rd., Ping-Chen City, Taoyuan Hsien (TW)

( * ) Notice: Subject to any disclaimer, the term of this patent is extended or adjusted under 35 U.S.C. 154(b) by 0 days.

(21) Appl. No.: 09/779,493

(22) Filed: Feb. 9, 2001

(30) Foreign Application Priority Data

Dec. 20, 2000 (TW) .......................................... 089222112

(51) Int. Cl.$^7$ ................................................ F01D 5/14
(52) U.S. Cl. ................................................ 416/223 R
(58) Field of Search ........................... 416/223 R, 235, 416/236 R, 232, 241 A

(56) References Cited

U.S. PATENT DOCUMENTS 2,392,671 A * 1/1946 Husted ........................ 230/266

* cited by examiner

Primary Examiner—Edward K. Look
Assistant Examiner—James M McAleenan
(74) Attorney, Agent, or Firm—Rosenberg, Klein & Lee

(57) ABSTRACT

A blade for a ceiling fan includes at least one raised portion formed on the surface of the blade with a chamber in the raised portion of the blade. The raised portion will reduce the drag when the air passes over the blade because the blade has a smooth surface due to the raised portion. The recess in the raised portion provides flexibility to the blade of the present invention to lengthen the useful life of the blade for a ceiling fan.

7 Claims, 4 Drawing Sheets the blade (30) and multiple corresponding grooves (303) defined in the other face of the blade (30).

BLADE OF A CEILING FAN

BACKGROUND OF THE INVENTION

1. Field of the Invention

The present invention relates to a fan blade, and more particularly to a blade for a ceiling fan.

2. Description of Related Art

With reference to FIG. 7, a conventional blade (30) for a ceiling fan in accordance with the prior art is made of multiple wooden lamina (301). The lamina (301) are placed up one over another, bonded and pressed into an integral piece with a suitable thickness. The blade (30) includes multiple ridges (302) longitudinally formed on one face of the blade (30) and multiple corresponding grooves (303) defined in the other face of the blade (30).

The conventional blade of a ceiling fan has several disadvantages.

1. The fabrication process is complex, and the cost of the conventional blade is higher because the conventional blade for a ceiling fan is made of multiple wooden lamina that need to be pressed to form the ridges and the grooves.

2. The conventional blade for a ceiling fan is heavy so the load on the ceiling fan motor is significant.

3. The drag on the conventional blade is great. The ridges will cause greater drag and waste power when the ceiling fan is operated.

The present invention has arisen to mitigate and/or obviate the disadvantages of the conventional blade of a ceiling fan.

SUMMARY OF THE INVENTION

The main objective of the present invention is to provide an improved blade for a ceiling fan. The blade of the present invention includes at least one raised portion formed on the surface of the blade with a hollow chamber in the raised portion. The raised portion will reduce the windage resistance when the air passes over the blade because the blade has a smooth surface due the raised portion. The hollow chamber in the raised portion provides flexibility to the blade to lengthen the useful life of the blade.

Further benefits and advantages of the present invention will become apparent after a careful reading of the detailed description with appropriate reference to the accompanying drawings.

DETAILED DESCRIPTION OF THE INVENTION

Figure 1:
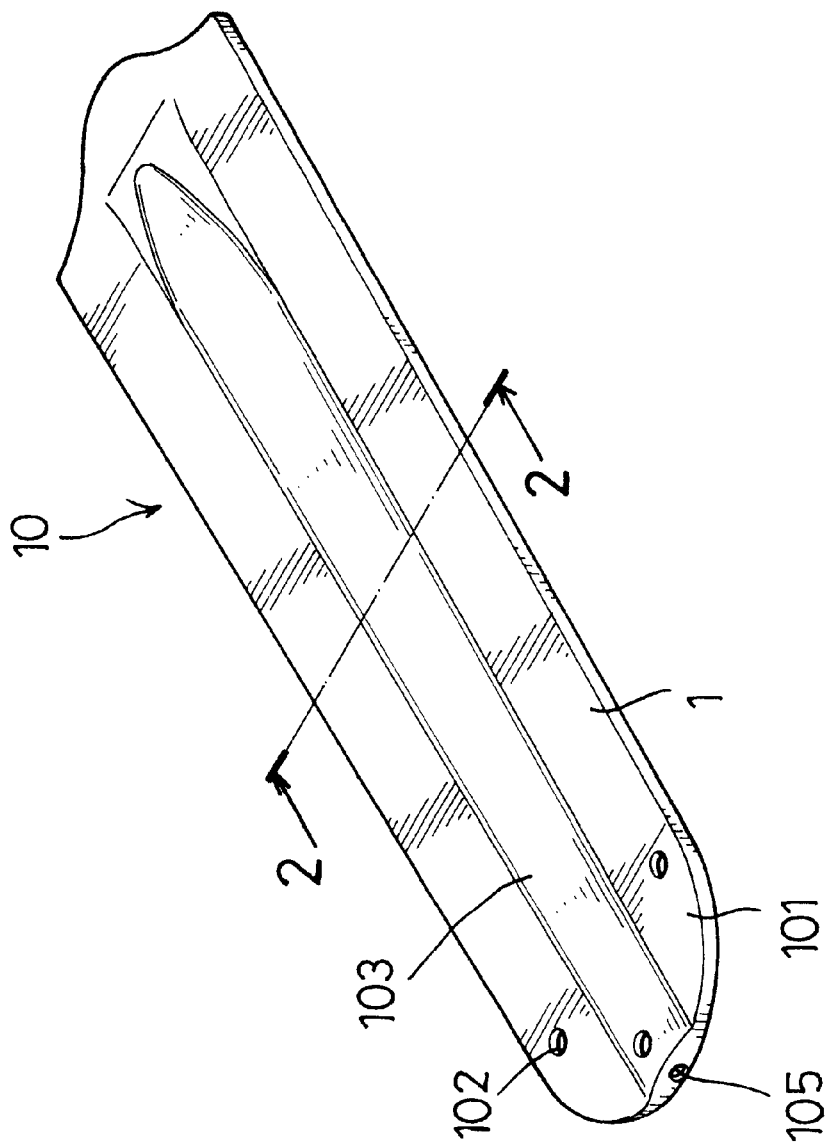
FIG. 1 is a perspective view of a blade for a ceiling fan in accordance with the present invention.
Figure 2:
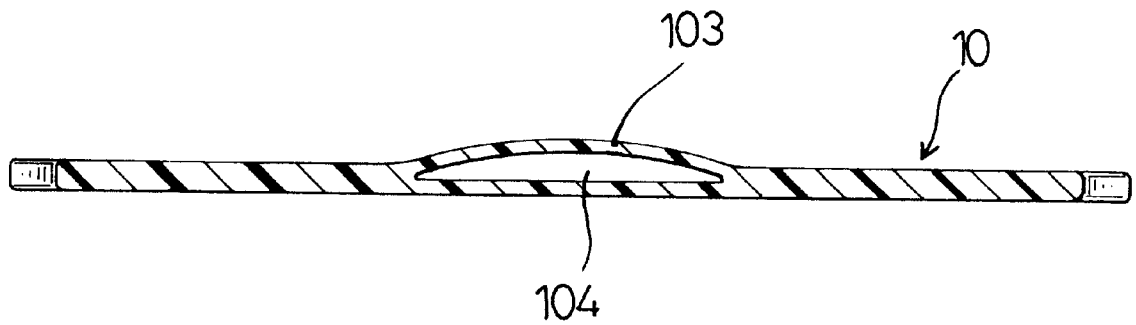
FIG. 2 is a cross sectional side plan view of the blade for a ceiling fan along line 2—2 in FIG. 1.

With reference to the drawings and initially to FIGS. 1 and 2, a blade for a ceiling fan in accordance with the present invention is made of plastic by injection molding. The blade (10) includes a connecting portion (101) having multiple through holes (102) to mount the blade (10) on a bracket by bolts. The blade (10) can reduce the load on the ceiling fan motor because the blade (10) is lighter than the conventional blade due to injection molding by plastic. The blade (10) includes a raised portion (103) longitudinally formed on one face of the blade (10) to provide flexibility to the blade (10). The surface of the raised portion (103) is smooth. A chamber (104) corresponding to the raised portion (103) is defined in the blade (10).

Figure 3:
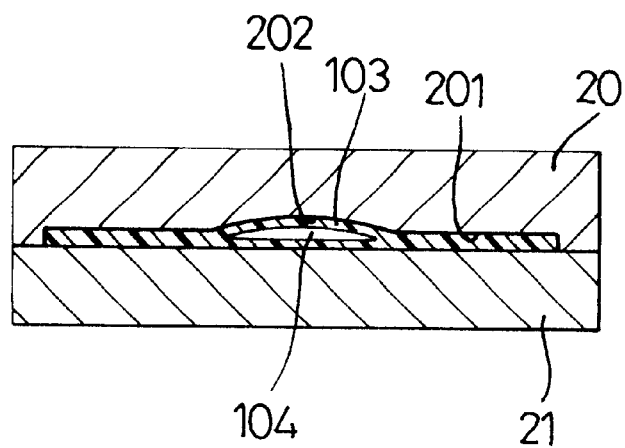
FIG. 3 is a cross sectional side plan view of the blade for a ceiling fan in FIG. 1 showing how the blade is formed in a mold.

With reference to FIG. 1 and 3, during fabrication, an upper mold (20) and a lower mold (21) securely abut each other and form a mold cavity (201). A smooth recess (202) is defined in a middle portion of one of the molds (20, 21) in the cavity (201). The liquid plastic is injected into the cavity (201) to full the volume of the cavity (201) about ninety percent and then high-pressure air (such as nitrogen) is centrally injected into the mold cavity (201) from the connecting portion (101) of the blade (10) by a tube (not shown) inserted into the mold cavity (201). The high-pressure air equally pushes the liquid plastic to the periphery of the mold cavity (201) to form a raised portion (103) on one face of the blade (10) and a chamber (104) in the blade (10). The tube is pull out when the forming process is finish and a hole (105) is defined to communicating with the chamber (104) in the blade (10).

Figure 4:
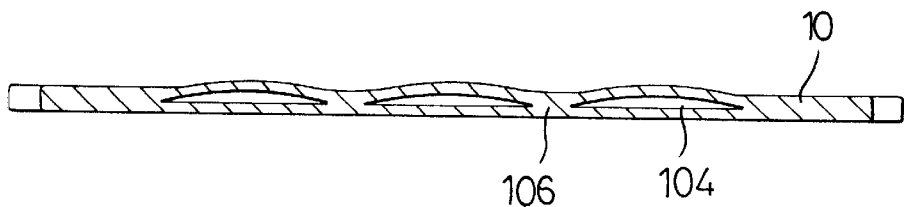
FIG. 4 is a cross sectional side plan view of another embodiment of the blade for a ceiling fan in accordance with present invention.

With reference to FIG. 4, in another embodiment of the present invention, the blade (10) includes multiple separate chambers (104) defined in the blade (10) and a rib (106) is defined between adjacent chambers (104) to strengthen the structure of the blade (10).

Figure 5:
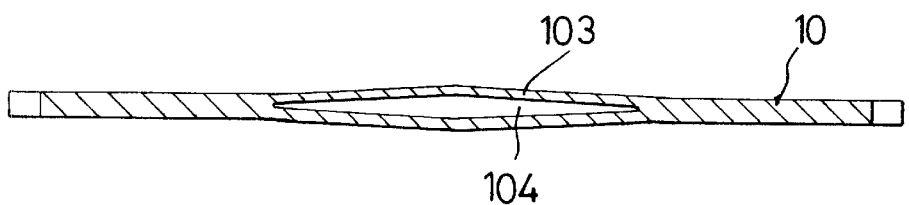
FIG. 5 is a cross sectional side plan view of another embodiment of the blade for a ceiling fan in accordance with present invention.

With reference to FIG. 5, in another embodiment of the present invention, the blade (10) includes one chamber (104) defined in the blade (10) and a raised portion (103) formed on each face of the blade (10). The shape of the cross section of the chamber (104) is rhombic, and the shape of the cross section of the raised portion (103) is triangular.

Figure 6:
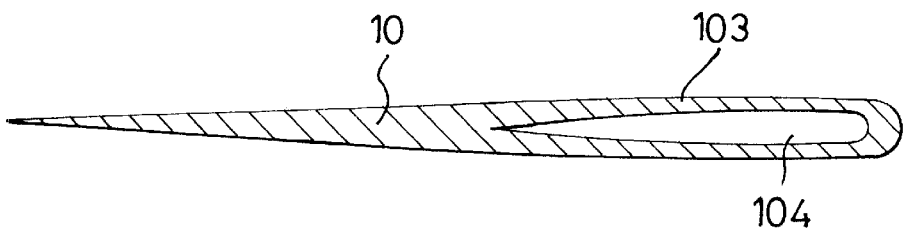
FIG. 6 is a cross sectional side plan view of another embodiment of the blade for a ceiling fan in accordance with present invention.
Figure 7:
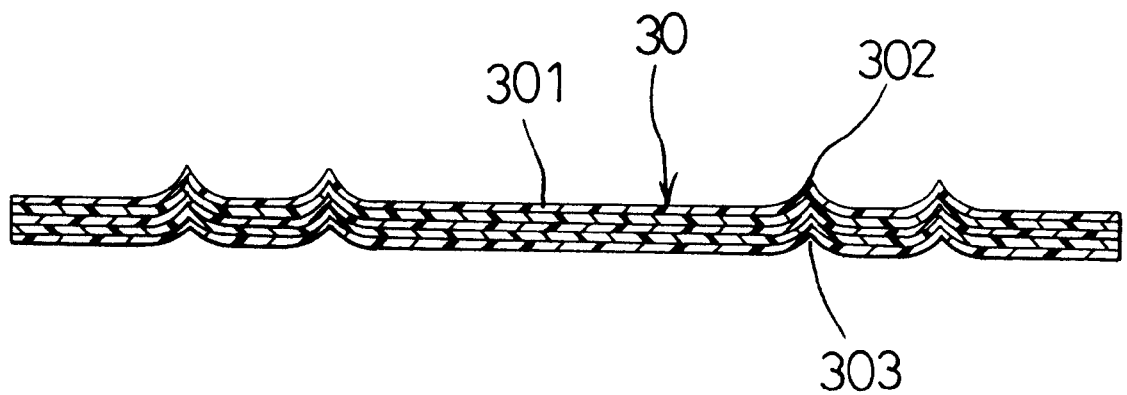
FIG. 7 is a cross sectional side plan view of a conventional blade for ceiling fan in accordance with the prior art.

With reference to FIG. 6, in another embodiment of the present invention, the shape of the cross section of the blade (10) and the chamber (104) is tear dropped. The chamber (104) is defined in the enlarged side of the blade (104) to reduce drag.

As described above, the blade of a ceiling fan in accordance with the present invention has several advantages.

1. The weight of the blade is lighter than the conventional blade for a ceiling fan so that the load on the ceiling fan is reduced because the blade in accordance with the present invention is integrally formed by injection molding and made of plastic.

2. The chamber in the blade is defined to provide the flexibility to the blade to prevent the blade from breaking during operating.

3. The surface of the raised portion is smooth so that the drag is reduced when the blade is operated.

Although the invention has been explained in relation to its preferred embodiment, it is to be understood that many other possible modifications and variations can be made without departing from the spirit and scope of the invention as hereinafter claimed.

What is claimed is:

1. A ceiling fan blade being integrally made by injection molding and comprising:

a connecting portion formed on one end of the ceiling fan blade;

at least one raised portion longitudinally formed on one face of the blade; and at least one chamber longitudinally defined in the blade and corresponding with the at least one raised portion.

2. The blade for a ceiling fan as claimed in claim 1, wherein two raised portions are respectively formed on opposite faces of the blade.

3. The blade for a ceiling fan as claimed in claim 2, wherein the raised portion has an arcuate cross section.

4. The blade for a ceiling fan as claimed in claim 2, wherein the raised portion has a triangular cross section.

5. The blade for a ceiling fan as claimed in claim 1, wherein the chamber is defined in one side of the blade.

6. The blade for a ceiling fan as claimed in claim 1, wherein the raised portion has an arcuate cross section.

7. The blade for a ceiling fan as claimed in claim 1, wherein the raised portion has a triangular cross section.

* * * * *